(12) United States Patent
Hung et al.

(10) Patent No.: US 12,088,194 B2
(45) Date of Patent: Sep. 10, 2024

(54) HYBRID-MODE POWER FACTOR CORRECTOR AND METHOD OF OPERATING THE SAME

(71) Applicant: ASIAN POWER DEVICES INC., Taoyuan (TW)

(72) Inventors: Tsung-Liang Hung, Taoyuan (TW); Shao-Hsien Chiu, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 216 days.

(21) Appl. No.: 17/951,481

(22) Filed: Sep. 23, 2022

(65) Prior Publication Data

US 2023/0412069 A1 Dec. 21, 2023

(30) Foreign Application Priority Data

Jun. 20, 2022 (TW) .................................. 111122843

(51) Int. Cl.
| | |
|---|---|
| *H02M 1/42* | (2007.01) |
| *H02M 1/00* | (2006.01) |
| *H02M 1/08* | (2006.01) |
| *H02M 3/335* | (2006.01) |
| *H02M 7/06* | (2006.01) |

(52) U.S. Cl.
CPC ....... *H02M 1/4241* (2013.01); *H02M 1/0058* (2021.05); *H02M 1/08* (2013.01); *H02M 3/33515* (2013.01); *H02M 7/06* (2013.01)

(58) Field of Classification Search
CPC .... H02M 1/4241; H02M 1/0058; H02M 1/08; H02M 3/33515
See application file for complete search history.

(56) References Cited

U.S. PATENT DOCUMENTS

| | | | |
|---|---|---|---|
| 6,388,429 B1* | 5/2002 | Mao | G05F 1/70 323/222 |
| 2011/0221402 A1* | 9/2011 | Park | G05F 1/70 323/211 |
| 2019/0199205 A1* | 6/2019 | Tao | H02M 7/217 |

\* cited by examiner

*Primary Examiner* — Jue Zhang
*Assistant Examiner* — Afework S Demisse
(74) *Attorney, Agent, or Firm* — MUNCY, GEISSLER, OLDS & LOWE, P.C.

(57) ABSTRACT

A hybrid-mode power factor corrector includes a power factor correction circuit, a zero-crossing detection circuit, and a controller. The power factor correction circuit includes a power inductor and a power switch, and the zero-crossing detection circuit detects an inductor current. The controller controls the switching of the power switch by an operation frequency to control the power factor correction circuit converting an input voltage into an output voltage, and controls an input current drawn by the power factor correction circuit to follow the input voltage. The controller turns on the power switch to according to a switching time of the power switch when the power switch is switched to reach to the operation frequency and the inductor current is as low as a threshold value close to zero.

16 Claims, 5 Drawing Sheets

HYBRID-MODE POWER FACTOR CORRECTOR AND METHOD OF OPERATING THE SAME

BACKGROUND

Technical Field

The present disclosure relates to a power factor corrector and a method of operating the same, and more particularly to a hybrid-mode power factor corrector and a method of operating the same.

Description of Related Art

The statements in this section merely provide background information related to the present disclosure and do not necessarily constitute prior art.

Power factor correction (PFC) is to improve the ratio of apparent power to actual power, that is, the ratio of effective power divided by total power consumption (apparent power). Power factor can measure the degree to which electricity is effectively utilized. When the power factor is larger, it means that the utilization rate of electricity is higher. Different countries have different regulations on the use of mains electricity, but basically, PFC is required when the input power of the power supply exceeds 75 watts.

Figure 1:
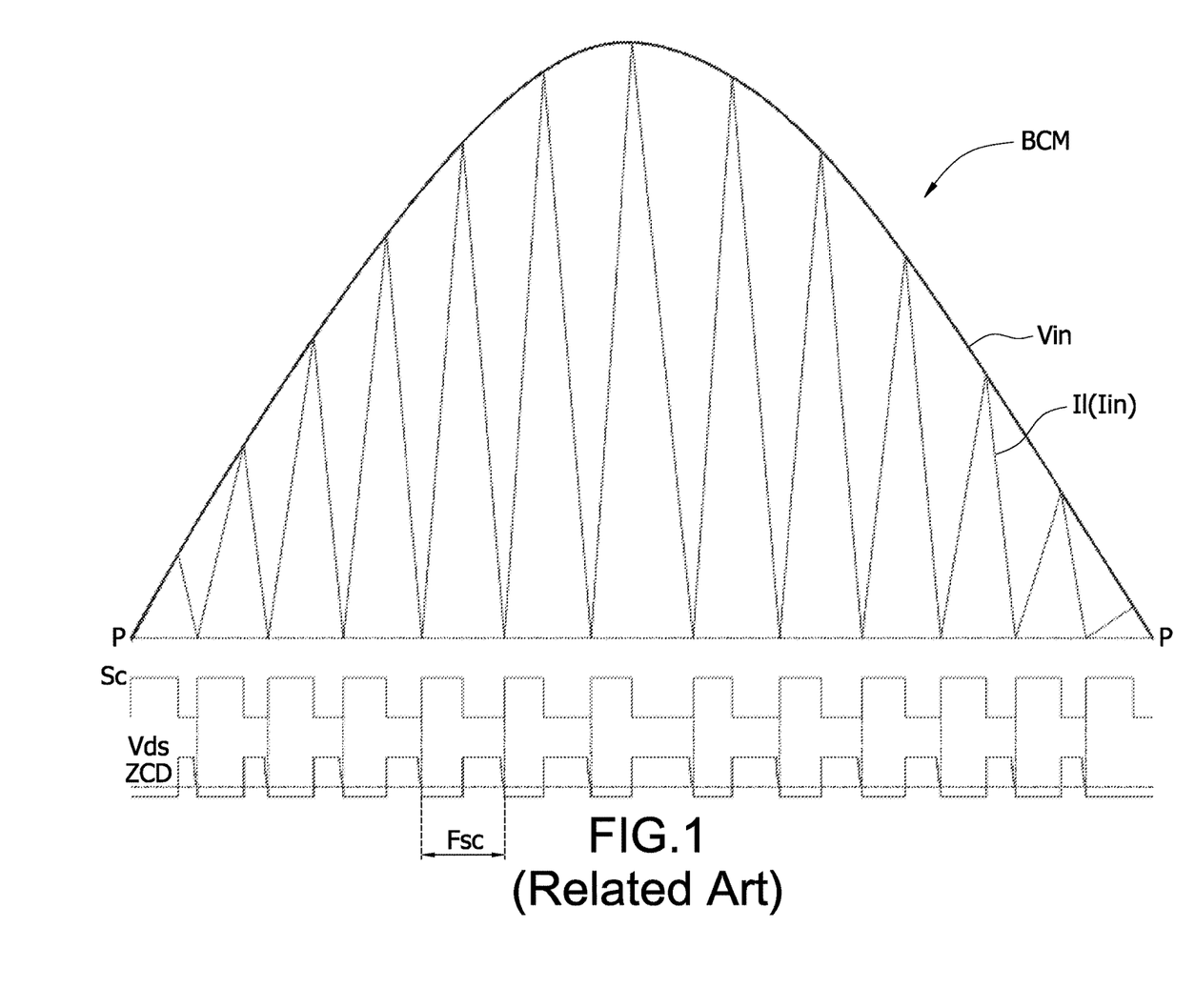
FIG. 1 is a schematic waveform of operating a related-art power factor corrector in a boundary conduction mode.

The implementation and application of traditional active power factor correctors are generally based on boost converters. According to the operation of the inductor current, the active power factor correctors can be roughly divided into a discontinuous conduction mode (DCM), a boundary conduction mode (BCM), and a continuous conduction mode (CCM). As shown in FIG. 1, in the BCM, the peak value of the inductor current I1 will be larger than that in the CCM so that the power device needs to bear the disadvantages of higher current stress and conduction loss. However, the BCM does not have the problem of diode reverse recovery time, and the switching voltage of the two ends of the main power switch can be switched at a lower voltage (valley) so it has the advantage of less switching loss. However, when the inductor current is small, operating in the CCM is accompanied by a higher switching frequency, resulting in additional switching losses, which in turn result in lower efficiency.

Accordingly, the present disclosure provides a power factor corrector and a method of operating the same to operate in the CCM, BCM, and DCM to avoid the problem that the switching frequency is too high when the inductor current is small.

SUMMARY

In order to solve the above-mentioned problems, the present disclosure provides a hybrid-mode power factor corrector. The hybrid-mode power factor corrector includes a power factor correction circuit, a zero-crossing detection circuit, and a controller. The power factor correction circuit receives an input voltage, and the power factor correction circuit comprises a power inductor and a power switch. The zero-crossing detection circuit is coupled to the power inductor, and detects the resonance of a switch voltage between two ends of the power switch. The controller is coupled to the power switch and the zero-crossing detection circuit, and controls the switching of the power switch by an operation frequency to control the power factor correction circuit converting the input voltage into an output voltage, and control an input current drawn by the power factor correction circuit to follow the input voltage. The controller turns on the power switch when an inductor current flowing through the power inductor is to zero, the resonance of the switch voltage is close to a threshold value of the zero-crossing detection circuit, and a switching time of the power switch reaches to the operation frequency.

In order to solve the above-mentioned problems, the present disclosure provides a method of operating a hybrid-mode power factor corrector. The method includes steps of: switching a power switch of a power factor correction circuit by an operation frequency to control the power factor correction circuit converting an input voltage into an output voltage, and controlling an input current drawn by the power factor correction circuit to follow the input voltage, detecting a resonance of a switch voltage across two ends of the power switch, and turning on the power switch when an inductor current flowing through the power inductor is to zero, the resonance of the switch voltage is close to a threshold value of the zero-crossing detection circuit, and a switching time of the power switch reaches to the operation frequency.

The main purpose and effect of the present disclosure is that the hybrid-mode power factor corrector can operate a power factor correction circuit in a continuous conduction mode (CCM), a boundary conduction mode (BCM), and a discontinuous conduction mode (DCM) according to an inductor current, and a switching frequency of the power switch is limited to be approximately equal to the fixed frequency so as to avoid the increase of the switching frequency of the power switch and reduce the switching loss, thereby increasing the efficiency of the power factor corrector.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2:
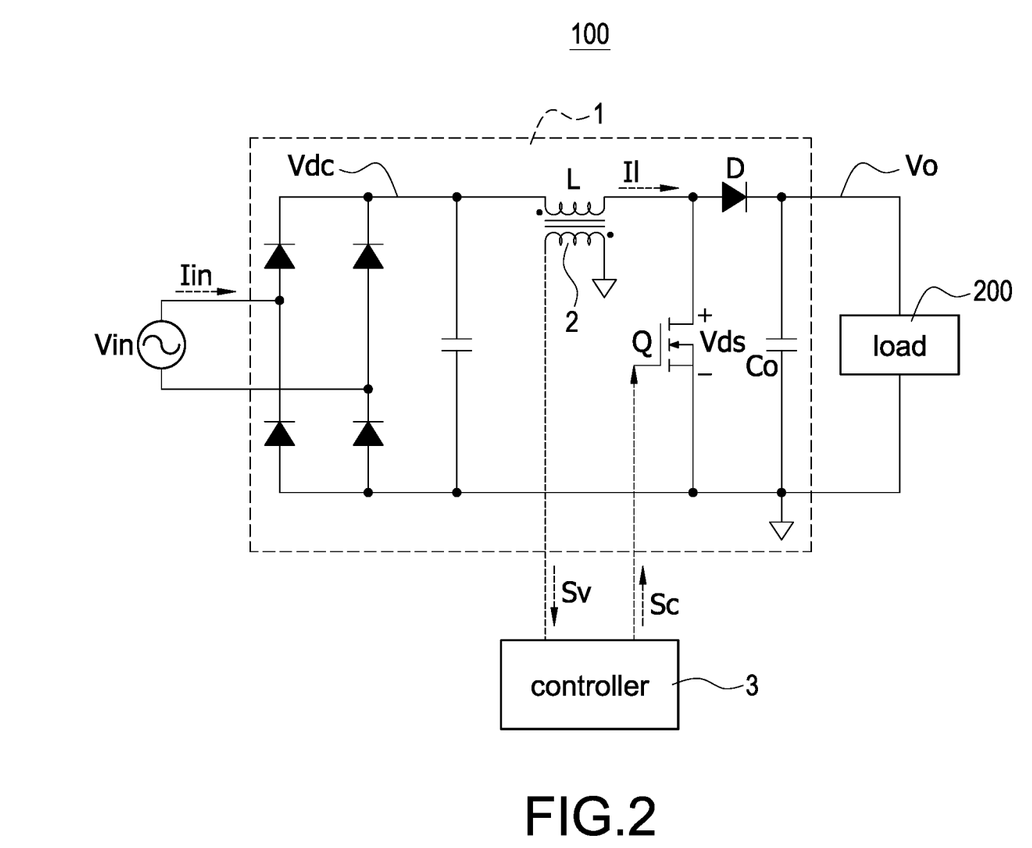
FIG. 2 is a block circuit diagram of a hybrid-mode power factor corrector according to the present disclosure.

Please refer to FIG. 2, which shows a block circuit diagram of a hybrid-mode power factor corrector according to the present disclosure. The hybrid-mode power factor corrector 100 receives an AC (alternating current) input voltage Vin, converts the input voltage Vin into a DC (direct current) output voltage Vo, and provides the output voltage Vo to supply power to a load 200. The hybrid-mode power factor corrector 100 includes a power factor correction circuit 1, a zero-crossing detection circuit 2, and a controller 3. In one embodiment, the power factor correction circuit 1 may be a step-up or step-down conversion circuit, or an isolated or non-isolated conversion circuit. Take the step-up conversion circuit as an example, the power factor correction circuit 1 includes a power inductor L and a power switch Q. The hybrid-mode power factor corrector 100 receives the input voltage Vin, rectifies the input voltage Vin into a DC voltage Vdc through a bridge rectifier circuit, and then the power inductor L is charged (stored) and discharged to generate an inductor current I1 through the switching of the power switch Q so as to convert the DC voltage Vdc into the output voltage Vo.

The zero-crossing detection circuit 2 is coupled to the power inductor L, and detects the resonance of a switch voltage Vds across two ends of the power switch Q. In one embodiment, the zero-crossing detection circuit 2 may be a winding-coupling type, CT (current transformer)-induction type, or resistance-induction zero-crossing detection circuit. Take the winding-coupling type zero-crossing detection circuit as an example, the zero-crossing detection circuit 2 is a winding, and the winding is coupled to the power inductor L to detect the resonance of the switch voltage Vds to generate a corresponding voltage signal Sv. The controller 3 is coupled to the power switch Q and the zero-crossing detection circuit 2, and the switching of the power switch Q is controlled by the control signal Sc with the operation frequency so as to control the power factor correction circuit 1 to convert the input voltage Vin into the output voltage Vo. The feature of the hybrid-mode power factor corrector 100 is that by controlling the switching timing of the power switch Q, the controller 3 can control the waveform of an input current Iin drawn by the power factor correction circuit 1 to follow the input voltage Vin so as to improve the power factor at the input end of the hybrid-mode power factor corrector 100 (usually it can be improved to above 0.9). In particular, an operation frequency may be substantially a fixed frequency (for example, but not limited to, 65 kHz).

Figure 3:
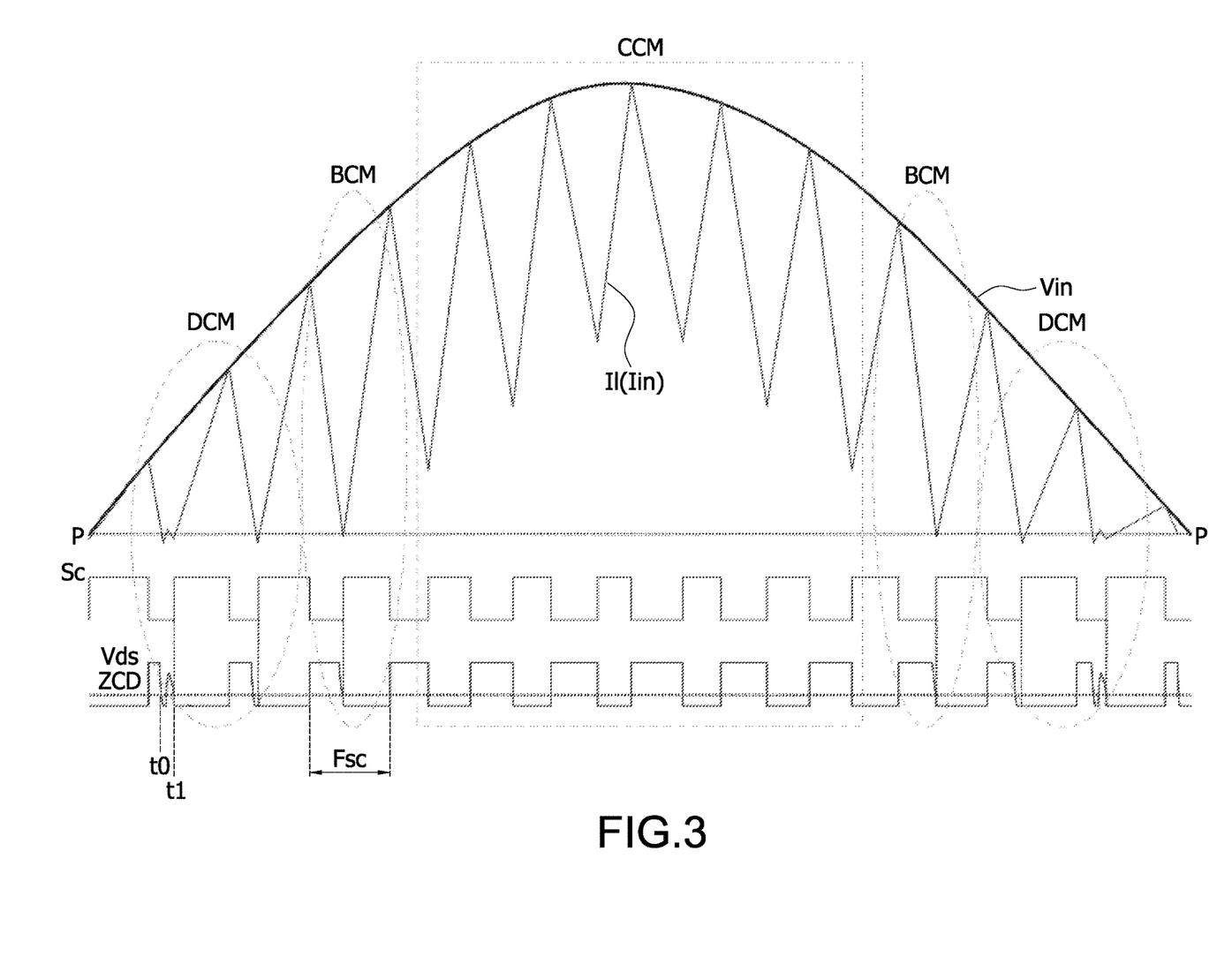
FIG. 3 is a schematic waveform of the hybrid-mode power factor corrector according to the present disclosure.

Please refer to FIG. 3, which shows a schematic waveform of the hybrid-mode power factor corrector according to the present disclosure, and also refer to FIG. 2. The main purpose and feature of the present disclosure is that the controller 3 can operate the power factor correction circuit 1 in a continuous conduction mode (CCM), a boundary conduction mode (BCM), or a discontinuous conduction mode (DCM) based on a magnitude of the inductor current I1. When the inductor current I1 is larger, the power factor correction circuit 1 operates in the CCM so that the peak value of the inductor current I1 is smaller to reduce the current stress and conduction loss of the power components such as the power switch Q, thereby increasing the efficiency at full load. When the inductor current I1 is smaller, the power factor correction circuit 1 operates in the BCM or the DCM so as to limit the frequency of switching the power switch Q (i.e., the switching frequency) to be approximately equal to the fixed frequency, thereby preventing the switching frequency of the power switch Q from increasing to reduce the switching loss so as to increasing the efficiency of the power factor corrector (when the load is light or the inductor current I1 is close to a zero-crossing point P). The main reason is that when the inductor current I1 is closer to the zero-crossing point P of the input voltage Vin, the inductor current I1 is more quickly touches the input voltage Vin (sine wave) and the zero-crossing point P since the voltage difference between the two is too low). If the operation frequency Fsw is not limited, when the inductor current I1 is closer to the zero-crossing point P, the switching frequency of the power switch Q will be faster.

Therefore, the controller 3 turns on the power switch Q when determining that the switching time of the power switch Q reaches the operation frequency and the inductor current I1 drops to zero and the zero-crossing detection approaches the threshold value (for example, but not limited to, 0 amp) so as to limit the switching frequency of the power switch Q (i.e., the frequency of the control signal Sc) to be approximately equal to the fixed frequency. In particular, the fixed frequency is approximately equal to the frequency at which the power factor correction circuit 1 operates in the CCM (i.e., the fixed-frequency operation).

Under this operation rule, it can be expected that when the inductor current I1 is closer to the zero-crossing point P of the input voltage Vin, it means that the inductor current I1 is lower. On the contrary, when the inductor current I1 is closer to the peak value of the input voltage Vin, it means that the inductor current I1 is higher. Therefore, the controller 3 controls the power factor correction circuit 1 operating in the DCM according to the input voltage Vin within a first predetermined range around the zero-crossing point P (assumed to be 0 volt). Also, in the DCM, the power switch Q may be controlled to be turned on only when the switchable time point of the power switch Q reaches the operation frequency Fsw and the inductor current I1 is lower than a threshold value ZCD. In particular, in the DCM, when the inductor current I1 decreases to the threshold value ZCD, the switch voltage Vds will resonate due to the composition of the parasitic capacitance of the power switch Q and the power inductor L, and therefore the switch voltage Vds across the power switch Q also resonates. Accordingly, the best timing to control the conduction of the power switch Q is: after satisfying the conditions that the switchable time point of the power switch Q reaches the operation frequency Fsw and the inductor current I1 is as low as the threshold value ZCD, when the first resonance reaches to the valley, the power switch Q is to be turned on. Therefore, turning on under this condition can ensure zero-voltage/zero-current switching, and can reduce the switching loss of the power switch Q.

On the other hand, the controller 3 controls the power factor correction circuit 1 operating in the CCM according to the input voltage Vin being within a second predetermined range of the peak value, and also controls the power factor correction circuit 1 operating in BCM according to the input voltage Vin being outside the first predetermined range and the second predetermined range. When the power factor correction circuit 1 operates in the CCM, the controller 3 may control the power switch Q to be turned on when the switching time of the power switch Q has reached the operation frequency. In these three switching modes, the corresponding control is mainly performed on whether the inductor current I1 reaches zero, and the controller 3 restricts the three operation frequencies Fsw to be approximately equal to the fixed frequency to avoid that when the inductor current I1 is closer to the zero-crossing point P of the input voltage Vin, the operation frequency Fsw is too fast and the loss of the power switch Q is increased. In particular, in the prior art, the operation frequency of DCM and BCM may usually be variable.

Figure 4:
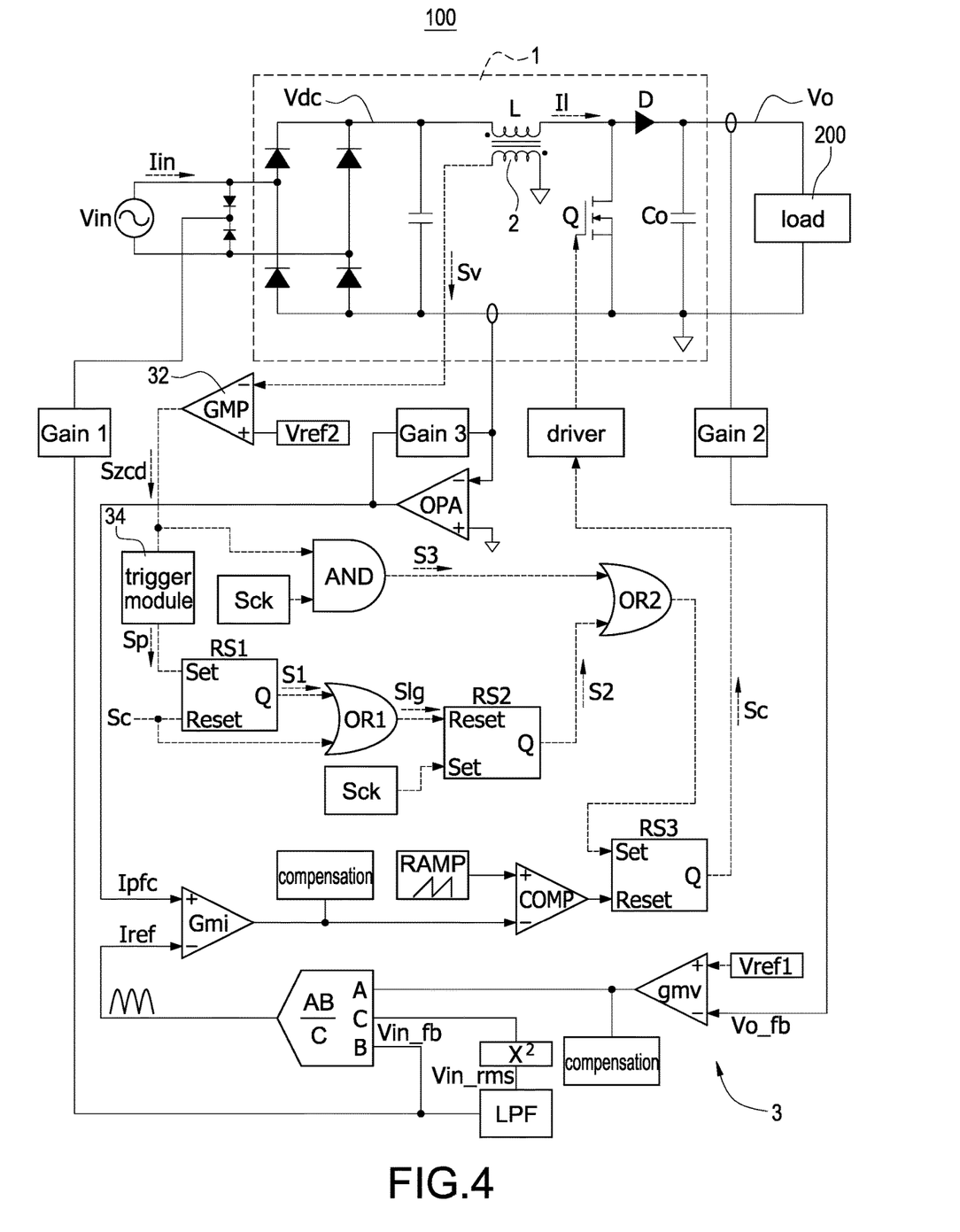
FIG. 4 is a block circuit diagram of a controller according to the present disclosure.

Please refer to FIG. 4, which shows a block circuit diagram of a controller according to the present disclosure, and also refer to FIG. 2 and FIG. 3. The controller 3 may be a signal processing device with a signal processing function such as a microcontroller (MCU), a digital signal processor (DSP), etc., and components shown inside may be a control module composed of a physical circuit or software control. For example, the comparator shown in FIG. 4 may be a physical comparator, or may be a comparison program formed by software. In FIG. 4, the control path that the present disclosure mainly controls the power switch Q to be turned on is represented by dotted lines, and the control path represented by solid lines is the control path that controls the power switch Q to be turned off. Since the control path for turning off the power switch Q is a common control path for a general power factor corrector, the components and their components that appear more frequently are used here to illustrate, but not limited thereto. Any control path that can be used as a control path for turning off the power switch Q for power factor correction should be included in the scope of this embodiment.

Here, the control path shown in dotted lines is briefly described. The controller 3 acquires a feedback signal Vo_fb of the output voltage Vo from the power factor correction circuit 1, amplifies an error with a reference voltage Vref1, and then compensates a corresponding error signal and enters a multiplier MULT. The controller 3 also acquires the feedback signal Vin_fb/Vin_rms of the input voltage Vin of the power factor correction circuit 1 into the multiplier MULT, and the feedback signal Vin_fb is also a rectified signal corresponding to the input voltage Vin. The multiplier MULT provides a half-sine wave signal Iref according to the error signal and the feedback signal Vin_fb/Vin_rms, which represents a reference signal that the input current Iin needs to follow. Afterward, the controller 3 acquires the current of the power factor correction circuit 1 and amplifies the error into an error amplification signal Ipfc, and then performs a compensation operation on the half-sine wave signal Iref and the error amplification signal Ipfc. After the pulse signal is compensated and compared with a triangle wave signal RAMP, a switch off signal representing the need of turning off the power switch Q will be acquired. Therefore, as shown in FIG. 3, after the power switch Q is turned on, when the inductor current I1 rises to the current value corresponding to the input voltage Vin, the controller 3 knows through the switch off signal that the power switch Q needs to be turned off so that the inductor current I1 starts to drop to follow the input voltage Vin.

The control paths shown in dotted lines are divided into two, one of which (path 1) is used for latching control of the power switch Q when the inductor current I1 will be as low as the threshold value ZCD and the turn-on timing of the power switch Q does not reach the operation frequency Fsw, and the other (path 2) is used to control the turn-on timing of the power switch Q when the inductor current I1 is as low as the threshold value ZCD. As shown in FIG. 4, the controller 3 includes a comparison module 32, a trigger module 34, a first flip flop RS1, a first OR module OR1, a second flip flop RS2, a AND module AND, a second OR module OR2, and a third flip flop RS3. The comparison module 32 is coupled to the zero-crossing detection circuit 2 and compares the voltage signal Sv corresponding to the switch voltage Vds with a reference voltage Vref2 corresponding to the threshold value ZCD to provide a comparison signal Szcd. The trigger module 34 generates a pulse signal Sp according to the comparison signal Szcd, and the trigger module 34 may provide a rising-edge trigger.

In path 1, the first flip flop RS1 provides a first output signal S1 to the first OR module OR1 according to the pulse signal Sp and the control signal Sc, or the first module OR1 provides a logic signal Slg to the second flip flop RS2 according to the first output signal S1 and the control signal Sc. The second flip flop RS2 provides a second output signal S2 according to the first output signal S1 and a clock signal Sck corresponding to the operation frequency Fsw. In path 2, the AND module AND provides a third output signal S3 according to the comparison signal Szcd and the clock signal Sck corresponding to the operation frequency Fsw. The second OR module OR2 receives the signals (i.e., the second output signal S2 and the third output signal S3) of the two paths (i.e., the path 1 and the path 2), and provides a switch on signal representing the power switch Q to be turned on according to the two signals, and the switch on signal and the switch off signal provide the control signal Sc through the logic operation of the third flip flop RS3.

In the CCM mode, the main operation paths of the controller 3 are the dotted control path and the solid line control path 1. In the solid line control path that controls the power switch Q to be turned off, when the power switch Q is turned on and the inductor current I1 rises to the current value corresponding to the input voltage Vin, the controller 3 knows that the power switch Q needs to be turned off through the switch off signal. The switch off signal will cause the third flip flop RS3 to reset and the control signal Sc will be at a low level (L), and before the power switch is turned off, the control signal Sc is at a high level (H) and the switch on signal is at a low level (L) in the solid line path. Therefore, the third flip flop RS3 provides the control signal Sc with the low level (L) to the power switch Q.

In the dotted control path that controls the power switch Q to be turned on, when the power switch Q is turned off, the switch off signal is at a low level (L), and the path 2 does not operate since the inductor current I1 is not lower than the threshold value ZCD. The path 1 is actuated according to the clock signal Sck. When the clock signal Sck reaches to a specific frequency (such as, but not limited to, 65 kHz), the second flip flop RS2 is set to provide the second output signal S2 with a high level (H) to the second OR module OR so that the switch on signal provided by the second OR module OR to be high level (H). Therefore, the third flip flop RS3 is triggered so that the control signal Sc provided by the third flip flop RS3 is at a high level (H). Therefore, in the CCM, the basis for turning on the power switch Q is mainly the control signal Sc and the clock signal Sck received by the second flip flop RS2.

In the DCM or the BCM, the main operation paths of the controller 3 are path 1 and path 2 of the dotted line control path and the solid line control path. The solid line control path that controls the power switch Q to be turned off is similar to the CCM, which is not repeated here. In the dotted line control path that controls the power switch Q to be turned on, the dotted line control path of the controller 3 is mainly according to the pulse signal Sp to control the power switch Q to remain off during a latching period. In particular, the latching period is a period between when the inductor current I1 falls to the threshold value ZCD and when the power switch Q switches and reaches the operation frequency Fsw. The path 1 is mainly used for confirming that the power switch Q is kept off during the latching period, and the path 2 is mainly used for confirming whether the switching time of the power switch Q reaches to the operation frequency Fsw.

Specifically, when the inductor current I1 drops to the threshold value ZCD and has not yet reached the operation frequency Fsw, the trigger module 34 generates the pulse signal Sp according to the inductor current I1 falling to the threshold value ZCD. According to the triggering of the pulse signal Sp, the first flip flop RS1 provides the first output signal S1 to latch the second flip flop RS2 so as to lock the second output signal S2 outputted by the two flip flops RS2 at a low level (L). On the other hand, the clock signal Sck of the path 2 has not been counted to reach a specific frequency (i.e., has not reached the operation frequency Fsw) so that the third output signal S3 provided by the AND module AND is also at a low level (L). The second OR module OR2 receives the signals with the low level of the two paths and provides the switch on signal with the low level to control the power switch Q to remain off during the latching period. Please refer to FIG. 3 again, the controller 3 will latch the second flip flop RS2 from time t0 to time t1 to control the power switch Q to remain off during the latching period so as to avoid the situation where the operation frequency Fsw is too high near the zero-crossing point P of the input voltage Vin.

On the other hand, when the inductor current I1 drops to the threshold value ZCD and reaches to the operation frequency Fsw, the AND module AND knows that the switching time of the power switch Q reaches to the operation frequency Fsw according to the comparison signal Szcd and the clock signal Sp, and the inductor current I1 is also as low as the threshold value ZCD. Therefore, the AND module AND correspondingly provides a third output signal S3 (i.e., high level (H)) that can turn on the power switch Q. Accordingly, in the DCM and BCM, the basis for turning on the power switch Q is mainly the comparison signal Szcd and the clock signal Sck.

In one embodiment, the components presented inside the controller 3 may be a control circuit composed of physical components, or a control logic composed of software programs. For example, the AND module AND may be an AND gate, an AND circuit composed of electronic components, or a programming language written and functional by software. The same is true for other components, and the detail description is omitted here for conciseness.

Figure 5:
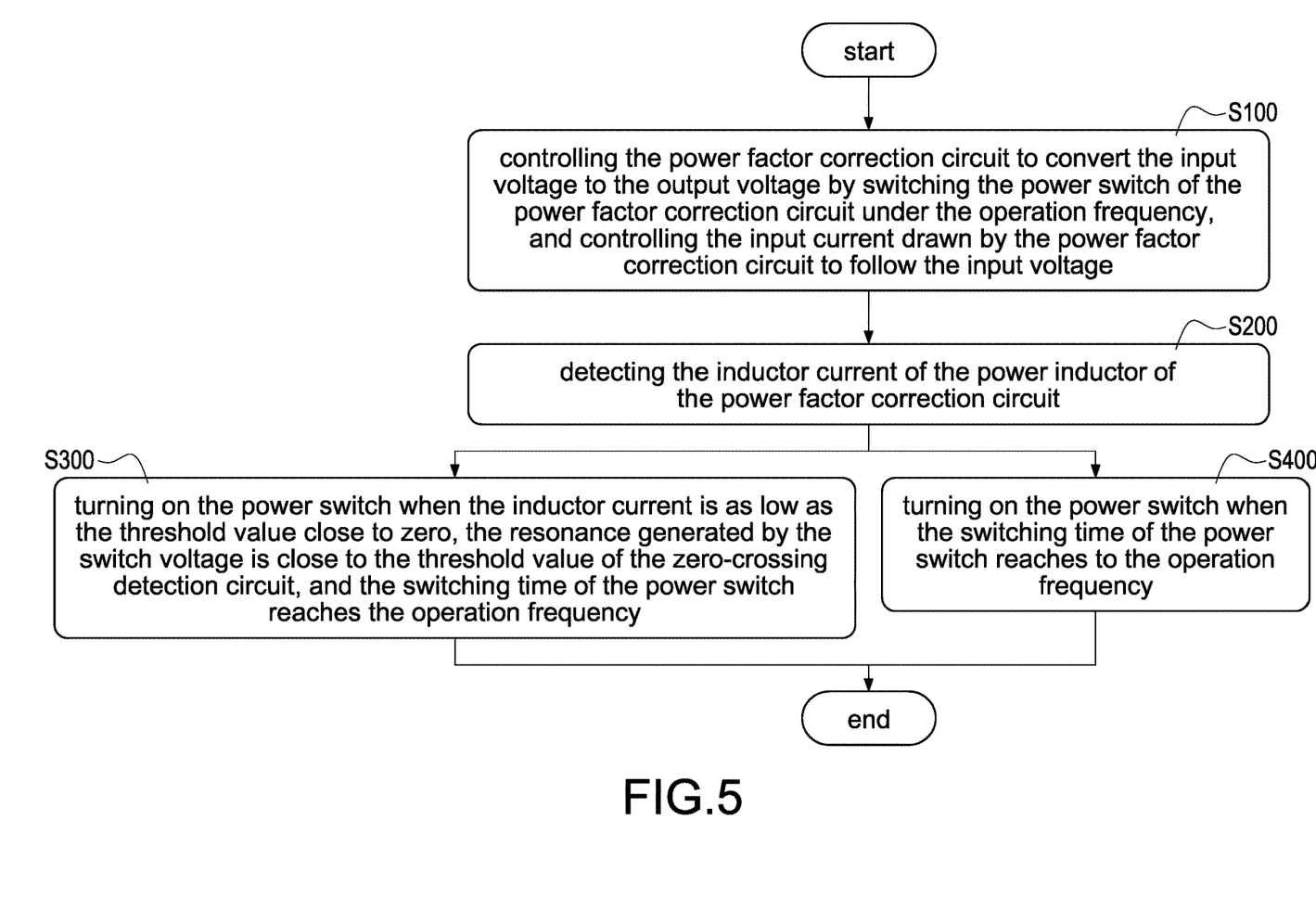
FIG. 5 is a flowchart of a method of operating the hybrid-mode power factor corrector according to the present disclosure.

Please refer to FIG. 5, which shows a flowchart of a method of operating the hybrid-mode power factor corrector according to the present disclosure, and also refer to FIG. 2 and FIG. 3. The method of operating the hybrid-mode power factor corrector 100 is used to mainly control the power factor correction circuit 1 in a continuous conduction mode (CCM), a boundary conduction mode (BCM), or a discontinuous conduction mode (DCM) based on a magnitude of the inductor current I1. When the inductor current I1 is smaller, the switching loss is reduced to improve the efficiency of the power factor corrector (when the load is light or the inductor current I1 is close to the zero-crossing point P).

When the power factor correction circuit 1 operates in CCM, BCM and DCM, the frequency of switching the power switch Q (i.e., the frequency of the control signal Sc) is limited to be approximately equal to the fixed frequency, thereby preventing that when the inductor current I1 is closer to the zero-crossing point P of the input voltage Vin, the operating frequency Fsw is too fast and the loss of the power switch Q is increased.

Therefore, the method of operating the hybrid-mode power factor corrector includes steps of: controlling the power factor correction circuit to convert the input voltage to the output voltage by switching the power switch of the power factor correction circuit under the operation frequency, and controlling the input current drawn by the power factor correction circuit to follow the input voltage (S100). In one embodiment, the controller 3 controls the switching of the power switch Q through the control signal Sc with an operation frequency so as to control the power factor correction circuit 1 to convert the input voltage Vin into the output voltage Vo, also controls the switching timing of the power switch Q to control the waveform of an input current Iin drawn by the power factor correction circuit 1 to follow the input voltage Vin so as to improve the power factor at the input end of the hybrid-mode power factor corrector 100 (usually it can be improved to above 0.9).

Afterward, detecting the inductor current of the power inductor of the power factor correction circuit (S200). In one embodiment, the zero-crossing detection circuit 2 is used to couple the power inductor L to detect the resonance of the switch voltage Vds between the two ends of the power switch Q to generate a corresponding voltage signal Sv. Finally, turning on the power switch when the inductor current is as low as the threshold value close to zero, the resonance generated by the switch voltage is close to the threshold value of the zero-crossing detection circuit, and the switching time of the power switch reaches the operation frequency (S300). In one embodiment, when the controller 3 determines that the switching time of the power switch Q reaches the operation frequency, and the inductor current I1 is as low as zero and the zero-crossing detection is close to the threshold (such as but not limited to zero ampere), the power switch Q is turned on so as to limit the switching frequency of the power switch Q (i.e., the frequency of the control signal Sc) to be approximately equal to the fixed frequency. In particular, the fixed frequency is approximately equal to the frequency at which the power factor correction circuit 1 operates in the CCM (i.e., the fixed-frequency operation). Alternatively, turning on the power switch when the switching time of the power switch reaches to the operation frequency (S400). This control is the control behavior of the power factor correction circuit 1 operating in the CCM.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A hybrid-mode power factor corrector, comprising:
a power factor correction circuit, configured to receive an input voltage, comprising a power inductor and a power switch,
a zero-crossing detection circuit, coupled to the power inductor, and configured to detect the resonance of a switch voltage between two ends of the power switch, and
a controller, coupled to the power switch and the zero-crossing detection circuit, and configure to control the switching of the power switch by an operation frequency to control the power factor correction circuit converting the input voltage into an output voltage, and control an input current drawn by the power factor correction circuit to follow the input voltage,
wherein the controller turns on the power switch when an inductor current flowing through the power inductor is to zero, the resonance of the switch voltage is close to a threshold value of the zero-crossing detection circuit, and a switching time of the power switch reaches to the operation frequency.

2. The hybrid-mode power factor corrector as claimed in claim 1, wherein the controller comprises:
- a comparison module, coupled to the zero-crossing detection circuit, and configured to compare a voltage signal corresponding to the inductor current to a reference voltage corresponding to the threshold value to provide a comparison signal, and
- a trigger module, configured to generate a pulse signal according to the comparison signal,
- wherein the controller controls the power switch to remain off during a latching period according to the pulse signal, and the latching period is a period between when the inductor current falls to the threshold value and when the switching time of the power switch reaches to the operation frequency.

3. The hybrid-mode power factor corrector as claimed in claim 2, wherein the controller further comprises:
- a first flip flop, configured to provide a first output signal according to the pulse signal, and
- a second flip flop, configured to provide a second output signal according to the first output signal,
- wherein the first flip flop provides the first output signal to latch the second flip flop according to the trigger of the pulse signal to lock the second output signal to control the power switch to remain off during the latching period.

4. The hybrid-mode power factor corrector as claimed in claim 2, wherein the controller further comprises:
- an AND module, configured to provide a third output signal according to the comparison signal and a pulse signal corresponding to the operation frequency,
- wherein the AND module knows that the switching time of the power switch reaches to the operation frequency according to the comparison signal and the pulse signal, and when the inductor current is to zero, the resonance generated by the switch voltage is close to the threshold value of the zero-crossing detection circuit to correspondingly provide the third output signal capable of turning on the power switch.

5. The hybrid-mode power factor corrector as claimed in claim 1, wherein the controller controls the power factor correction circuit operating in a discontinuous conduction mode when the input voltage is within a first predetermined range around a zero-crossing point, controls the power factor correction circuit operating in a continuous conduction mode when the input voltage is within a second predetermined range of a peak value, and controls the power factor correction circuit operating in a boundary conduction mode when the input voltage is outside the first predetermined range and the second predetermined range.

6. The hybrid-mode power factor corrector as claimed in claim 5, wherein in the discontinuous conduction mode, the switching time of the power switch reaches to the operation frequency and the inductor current is to zero, the resonance generated by the switch voltage is close to the threshold value of the zero-crossing detection circuit, and the power switch is turned on when the resonance reaches to a valley.

7. The hybrid-mode power factor corrector as claimed in claim 1, wherein the zero-crossing detection circuit is a winding, and the winding is coupled to the power inductor to detect the resonance of the switch voltage.

8. The hybrid-mode power factor corrector as claimed in claim 1, wherein the controller turns on the power switch when the switching time of the power switch reaches to the operation frequency.

9. A method of operating a hybrid-mode power factor corrector, comprising steps of:
- switching a power switch of a power factor correction circuit by an operation frequency to control the power factor correction circuit converting an input voltage into an output voltage, and controlling an input current drawn by the power factor correction circuit to follow the input voltage,
- detecting a resonance of a switch voltage across two ends of the power switch, and
- turning on the power switch when an inductor current flowing through the power inductor is to zero, the resonance of the switch voltage is close to a threshold value of the zero-crossing detection circuit, and a switching time of the power switch reaches to the operation frequency.

10. The method of operating a hybrid-mode power factor corrector as claimed in claim 9, further comprising a step of:
- turning off the power switch when the inductor current rises to a current value corresponding to the input voltage.

11. The method of operating a hybrid-mode power factor corrector as claimed in claim 9, further comprising steps of:
- comparing a voltage signal corresponding to the inductor current to a reference voltage corresponding to the threshold value to provide a comparison signal,
- generating a pulse signal according to the comparison signal, and
- controlling the power switch to remain off during a latching period according to the pulse signal,
- wherein the latching period is a period between when the inductor current falls to the threshold value and when the switching time of the power switch reaches to the operation frequency.

12. The method of operating a hybrid-mode power factor corrector as claimed in claim 11, further comprising steps of:
- providing a first output signal according to the pulse signal, and
- providing a second output signal according to the first output signal,
- wherein the first output signal is provided to latch the second output signal according to the trigger of the pulse signal to control the power switch to remain off during the latching period.

13. The method of operating a hybrid-mode power factor corrector as claimed in claim 11, further comprising steps of:
- providing a third output signal according to the comparison signal and a pulse signal corresponding to the operation frequency,
- knowing that the switching time of the power switch reaches to the operation frequency according to the comparison signal and the pulse signal, and when the inductor current is to zero, the resonance generated by the switch voltage is close to the threshold value of the zero-crossing detection circuit to correspondingly provide the third output signal capable of turning on the power switch.

14. The method of operating a hybrid-mode power factor corrector as claimed in claim 11, further comprising steps of:
- controlling the power factor correction circuit operating in a discontinuous conduction mode when the input voltage is within a first predetermined range around a zero-crossing point,
- controlling the power factor correction circuit operating in a continuous conduction mode when the input voltage is within a second predetermined range of a peak value, and controlling the power factor correction circuit operating in a boundary conduction mode when the input voltage is outside the first predetermined range and the second predetermined range.

15. The method of operating a hybrid-mode power factor corrector as claimed in claim 9, further comprising a step of:
in the discontinuous conduction mode, the switching time of the power switch reaches to the operation frequency and the inductor current is to zero, the resonance generated by the switch voltage is close to the threshold value of the zero-crossing detection circuit, and the power switch is turned on when the resonance reaches to a valley.

16. The method of operating a hybrid-mode power factor corrector as claimed in claim 9, further comprising a step of:
turning on the power switch when the switching time of the power switch reaches to the operation frequency.

* * * * *